United States Patent [19]

Cagle, deceased

[11] Patent Number: 4,745,904
[45] Date of Patent: May 24, 1988

[54] VACUUM CONTROLLED VARIABLE PRESSURE FUEL REGULATOR AND CARBURETOR

[75] Inventor: Toby T. Cagle, deceased, late of Bellflower, Calif., by Gary A. Cagle, administator

[73] Assignee: Cagle Corporation, Long Beach, Calif.

[21] Appl. No.: 172,986

[22] Filed: Jul. 28, 1980

Related U.S. Application Data

[63] Continuation-in-part of Ser. No. 68,190, Aug. 20, 1979, abandoned, which is a continuation of Ser. No. 803,597, Jun. 6, 1977, abandoned.

[51] Int. Cl.⁴ ............................................. F02B 33/00
[52] U.S. Cl. .................................... 123/512; 137/495; 137/483
[58] Field of Search ............. 137/495, 483; 261/34 R, 261/70; 123/510, 511, 512

[56] References Cited

U.S. PATENT DOCUMENTS

| | | | |
|---|---|---|---|
| 2,475,086 | 7/1949 | Ensign | 137/483 X |
| 3,741,240 | 6/1973 | Berriman | 137/495 X |
| 3,926,162 | 12/1975 | Haase | 123/510 |
| 4,257,378 | 3/1981 | Bascle | 123/512 |

*Primary Examiner*—Harold W. Weakley
*Attorney, Agent, or Firm*—Christie, Parker & Hale

[57] ABSTRACT

A fuel regulator receives fuel from a fuel pump at essentially constant pressure and reduces the pressure of the fuel to a constant low value in response to a predetermined high to moderate vacuum in an inlet manifold of an internal combustion engine, the vacuum corresponding to low or moderate load. At high load the regulator supplies fuel at a pressure proportional to absolute manifold pressure. At low to moderate loads the fuel at low pressure passes into the float bowl of a carburetor when a float controlled needle valve opens in response to a low level of fuel in the bowl as fuel is burned in the engine. The low pressure does not unseat the needle valve and supply an excess of fuel to the bowl. At high loads, the fuel pressure to the bowl is adequate to supply the increase rate of fuel such loads demand. As a result, the engine operates lean at low to moderate loads and richer at high loads. The regulator has a first diaphragm controlled valve. A second diaphragm controlled by manifold vacuum opens the valve at high absolute manifold pressure. At a range of low to moderate absolute manifold pressures, the first diaphragm maintains the valve open effectively the same amount regardless of manifold pressure within the range. The valve only closes when the load suddenly drops from a high load and prevents engine loading.

13 Claims, 1 Drawing Sheet

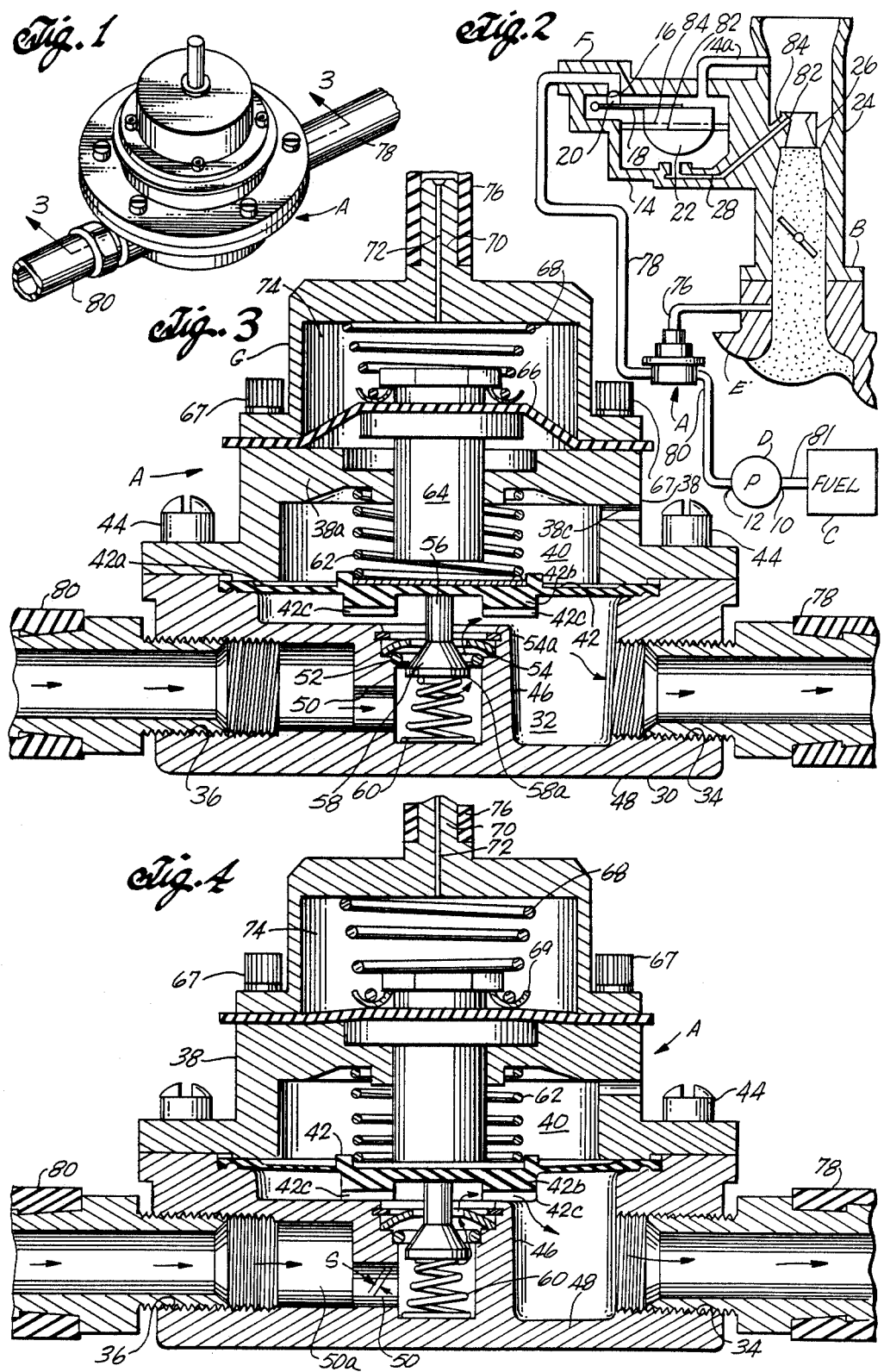

VACUUM CONTROLLED VARIABLE PRESSURE FUEL REGULATOR AND CARBURETOR

REFERENCE TO RELATED APPLICATIONS

This is a continuation-in-part application of application Ser. No. 68,190, filed Aug. 20, 1979, now abandoned, which in turn was a continuation of application Ser. No. 803,597, filed June 6, 1977, now abandoned.

BACKGROUND OF THE INVENTION

The present invention relates to variable pressure fuel systems for a carbureted internal combustion engine.

The fuel system of a carbureted internal combustion engine includes a fuel pump and a carburetor. The fuel pump boosts the pressure of the fuel and supplies the pressurized fuel to the carburetor. The carburetor has a needle valve controlled by a float in a float bowl. When the level of fuel rises in the float bowl, the float buoyed by the fuel acts on the needle valve and tends to close it. Fuel is drawn from the float bowl into a venturi of the carburetor by a pressure differential between the float bowl and the throat of the venturi. With increasing height of the fuel in the float bowl, the pressure differential tending to force a fuel into the carburetor venturi increases. Theoretically, when the fuel level in the float bowl reaches a predetermined height the float closes the needle valve.

The fuel pump delivery pressure tends to unseat the needle valve and admit fuel into the carburetor float bowl. When the pressure tending to force fuel into the venturi increases, the fuel level in the float bowl increases and an excessive amount of fuel can be delivered to the venturi. The engine will then run fuel-rich. Fuel economy suffers. The higher the fuel pressure, the greater the height of fuel in the float bowl necessary to increase the force of the float sufficiently to close the valve. Quite often the height of fuel in the float bowl at less than full load produces a richer fuel-to-air ratio than is required for satisfactory engine operation. Vibration and inertial effects on the needle valve can unseat the valve even when fuel height in the float bowl is at its theoretical correct value. An excess amount of fuel then enters the float bowl.

Fuel pump delivery pressure is designed for the maximum fuel consumption rate requirements of an engine. A typical pressure is 6 p.s.i.g. Obviously, when operating at less than maximum load the required rate of fuel delivery drops off accordingly.

Under full load, fuel will be delivered rapidly to the carburetor. When there is a sudden drop in load, the carburetor can "load up" because the inertia of the fuel in the delivery line adds to the fuel pressure to keep the needle valve open too long.

Excessive fuel pressure can also lead to percolation and hard start problems in hot weather. With excess fuel in the float bowl and a high vapor pressure, the fuel tends to percolate out of the bowl. The high vapor pressure adds to the excessive height of fuel in the float bowl to create an excessively fuel-rich condition that makes starting difficult.

The problem of excessive fuel pressure at a carburetor has been recognized in the art. U.S. Pat. No. 2,737,167 to Dickey proposes to solve the problem by a system that meters fuel proportionally to engine demand over the full range of demand possibilities. U.S. Pat. No. 2,905,455 to Eberhardt provides low fuel pressure at idle and high fuel pressure at all other speeds. U.S. Pat. No. 3,039,485 to Brohl, like Dickey, describes a proportioning system. With increasing load, fuel pressure increases. Load is sensed by manifold vacuum acting on a diaphragm.

Proportional systems can still supply too much fuel because of excessive delivery pressure to the carburetor, and, therefore, these systems result in improved but not optimized fuel economy.

Those systems employing a proportional increase in fuel pressure do not completely overcome the problem of the needle valve opening when it should not because fuel pressure acting on the needle valve tending to open it increases with load. In other words, if the fuel pump delivery pressure is maintained at a relatively low value over most of the operating range of an engine and stepped up only on occurrences of high demand, a larger margin exists over those systems that are proportional. In addition, those systems that employ a proportional system operated from engine manifold on vacuum risk the admission of fuel directly into the manifold upon failure of the diaphragm, and risk engine fire. Moreover, there are different fuel pump output pressures for different types of fuel pumps. For a device of universal application to apply with different fuel pumps and different output pressures, the device must be tolerant of these different output pressures.

It has also been a practice to reduce the pressure of the fuel to the needle valve to a single low value.

This has not been satisfactory in that the fuel at a single reduced pressure results in the fuel in the carburetor bowl being held at a single low level. When an engine is under a substantial load, being accelerated, or being started, it is desirable to have a relatively high fuel level in the bowl to provide a richer mixture.

SUMMARY OF THE INVENTION

A variable fuel pressure regulator for use with an internal combustion engine combines with a fuel pump that discharges fuel at a constant pressure and a carburetor with a fuel controlling needle valve to assure that excessive fuel is not delivered to the carburetor and burned by the engine.

The present invention provides a fuel system of a combination of a carburetor, a fuel pump and a regulator. The regulator reduces fuel pump delivery pressure to the carburetor to a constant low level when an engine is operating under normal operating conditions and at less than full loads, say under normal highway driving conditions or normal in-town driving conditions. During startup and at times of high demand, as in rapid acceleration, or passing, or under very high loads, the regulator delivers fuel at a pressure proportional to load. Thus for most of the range of vehicle operation the carburetor sees low pressure fuel. For startup and those occasions when the engine is loaded, the carburetor sees adequate fuel pressure to satisfy the corresponding high fuel demands.

In one form the present invention contemplates, in combination with a fuel pump and a carburetor, a regulator that includes a pair of elements that move in response to force differentials, such as flexible diaphragms. A first of these elements sees fuel on one of its sides. A spring acts in opposition to fuel pressure on this element and tends to open a valve coupled to the element. The valve is situated with respect to fuel so that fuel pressure acting on the valve tends to close it. In normal operation the valve is spaced from the seat to admit to the passage of fuel through the regulator. The first element is acted upon at this time only by fuel and the spring. With greater fuel pressure, the valve will close closer to the seat, reducing the fuel flow past the valve and the pressure of the fuel acting on the element that tends to close the valve. The regulating function is then performed. During this stage, regulation is effected solely by a differential pressure or force between the force applied on the element by fuel pressure and the opposition force applied on the element by a spring. The regulation thus effected dominates the pressure delivered to the carburetor for the majority of an engine operation.

The second element responds to a spring and the vacuum of the inlet manifold on one of its sides to move with inlet manifold pressure. The spring urges the second element towards the first element and inlet vacuum urges the second element away. As manifold pressure approaches atmospheric the second element couples to the first one to bias that element and the valve towards a more open position. The valve, as so controlled, then responds to manifold vacuum to open more and more as the manifold pressure gets closer and closer to atmospheric.

Thus the present invention regulates the fuel pump delivery pressure to a carburetor by keeping it at a constant low value for a majority of the engine's demands, but increasing the pressure for high engine loading, such as encountered in rapid acceleration and extremely steep grades with a ladened vehicle. The level of fuel in the carburetor bowl will correspond to a fuel-lean condition. The needle valve of the carburetor during most of the operation of the engine will not be subject to high fuel pump pressure which in conjunction with other forces could open the valve. Accordingly, the opportunity to operate at a fuel-rich condition reduces materially. The constant operating pressure assures a greater and greater difference between unseating pressures and actual operating pressures at the needle valve with increased fuel demand over that that would be the case with a system that was proportional over the entire range of engine operation. The use of a double diaphragm also avoids the possibility of fuel entering the inlet manifold by the rupture of a single diaphragm.

In a particular form the present invention contemplates the combination of a regulator, carburetor and fuel pump where the regulator has a housing containing two axially spaced-apart diaphragms. The first diaphragm sees fuel pressure on one side that tends to close a valve on a seat. On the opposite side of the diaphragm, a spring and atmospheric air oppose the fuel pressure. A stabilizing spring acting in opposition to the first spring may also be provided. As before, the diaphragm, during most of the time, will regulate by the fuel tending to close the valve. The second diaphragm is acted upon by a spring and intake manifold vacuum. This second diaphragm may, on its opposite side, see atmosphere. The second diaphragm moves towards the first diaphragm with increasing manifold pressure and, at a pressure corresponding to full load and open throttle, the two diaphragms are coupled together and the valve then responds to intake manifold pressure and moves proportionately with increased manifold pressure to increase fuel pressure to the carburetor. The valve preferably seats only when the fuel pressure is high and the second diaphragm uncouples from the first one, a condition that occurs when going from full load to moderate load. This prevents overloading the engine.

These and other features, aspects and advantages of the present invention will become more apparent from the following description, appended claims and drawings.

BRIEF DESCRIPTION OF THE FIGURES

FIG. 1 is a perspective view of a fuel pressure regulator in accordance with a preferred embodiment of the present invention;

FIG. 2 is a schematic view of the fuel regulator operatively associated with a carburetor, a fuel intake manifold of an internal combustion engine, and a fuel pump of the engine;

FIG. 3 is an elevational, longitudinal cross-sectional view of the fuel regulator showing the positions of two of its diaphragms when there is a negative pressure of prescribed magnitude in the inlet manifold; and FIG. 4 is the same view as in FIG. 3 but with the diaphragms in the positions they would occupy when the magnitude of the negative pressure in the inlet manifold has decreased substantially, and atmospheric pressure is approached.

DESCRIPTION OF THE PREFERRED EMBODIMENT

With reference to FIG. 1, a variable pressure fuel regulator A is shown in perspective. That regulator is shown in FIG. 2 with an internal combustion engine B. Engine B has a tank C for liquid fuel, say gasoline, and a fuel pump D that discharges fuel at a substantial pressure. Six to seven pounds pressure per square inch for fuel discharged from the pump D is common in present day automotive vehicles. Different fuel pumps have different outlet pressures. Pump D is coupled to tank C and pump A through a fuel inlet line 10 and a fuel discharge line 12. Regardless of the type of pump, the outlet pressure of the pump is more or less constant over the entire operating load range of an engine.

In FIG. 2, a carburetor F includes a bowl 14. A valve seat defining inlet 16 communicates the interior of the bowl with regulator A. A lever 18 is pivotally supported in bowl 14 by conventional means. Lever 18 supports a needle valve 20 that may be brought into sealing contact with valve seat defining inlet 16. Lever 18 has a free end that supports a float 22 inside the bowl 14. As fuel accumulates in the bowl, float 22 rises, moving counterclockwise in the Figure, to tend to close inlet 16 by needle valve 20 when the height of fuel becomes sufficient, the needle valve does close the inlet.

Carburetor F includes an air horn 24 that has a venturi passage 26. The venturi passage is in communication through a fuel passage 28 with the interior of bowl 14. A line 14a vents the bowl to atmosphere.

Pressure regulator A has a base 30 that defines a first cavity 32 in fluid communication at all times with a fuel outlet port 34. Cavity 32, as will subsequently be clear, communicates with a fuel inlet port 36 of the regulator. Pressure regulator A includes an intermediate section 38 capped by a top 38a that defines a second cavity 40. A first flexible diaphragm 42 acts as a barrier to separate first and second cavities 32 and 40. First fastening means 44, such as screws or the like, removably secure base 30, intermediate section 38 and first diaphragm 42 together as an integral unit, as shown in FIGS. 3 and 4.

A hollow boss 46 extends upwardly-from a bottom 48 of base 30 between fuel inlet port 36 and fuel discharge port 34. A transverse passage 50 in boss 46 opens into an extension passage 50a (FIG. 4) that in turn opens to fuel inlet port 36. An O-ring 52 mounts in the upper interior portion of boss 46. It is held in a fixed position by a clip 54 and a snap ring 54a. The O-ring can be removed. A valve element 56 depends from first diaphragm 42. The valve element includes a tapered head 58 that approaches but does not seat on the O-ring 52 when the first diaphragm 42 is in the position shown in FIG. 3. The O-ring centers the valve element when the element is subject to transverse displacement. In normal operation, valve element 56 never seats on the O-ring.

A first compressed helical spring 60 within the hollow of boss 46 urges valve element 56 upward. A second compressed helical spring 62 at one end abuts the upper surface of first diaphragm 42 and at its other end top 38a of intermediate section 38. The second spring 62 is situated in second cavity 40. Second cavity 40 is vented to atmosphere by a passage 38c as shown in FIG. 3.

A plunger 64 is received in a vertical bore 38b in top 38a and can slide up and down in the bore. A cover G mounts on intermediate section 38 and houses a second flexible diaphragm 66. Second fastening means 67, such as bolts or the like, secure second diaphragm 66 and cover G to intermediate section 38.

A third compressed helical spring 68 has one end in abutting contact with an interior surface of cover G and the other end in abutting contact with a clip 69 secured to the upper end of plunger 64. A tubular member 70 extends outwardly from cover G and has a longitudinal bore 72 in communication with a vacuum chamber 74 bounded by cover G and flexible diaphragm 66.

As seen in FIG. 2, a vacuum line 76 connects member 70 to a bore 77 within inlet manifold E to communicate with the interior thereof. A second conduit 78 connects fuel discharge port 34 to inlet 16. Fuel discharge line 12 of pump D is connected by a third conduit 80 to fuel inlet port 36 of regulator A. The fuel inlet 10 of pump D is connected by a fourth conduit 81 to the interior of fuel tank C.

Regulator A, by selecting springs 60, 62 and 68 of appropriate spring constants, may operate to deliver fuel to inlet 16 at a reduced pressure of, say one and one-fourth to one and one-half pounds per square inch gauge when engine B is operating under a majority of its operating conditions. But when the engine is being started, accelerated or under a substantial load the pressure at inlet 16 will be what is normally provided by pump D, say five to seven pounds per square inch gauge.

The magnitude of the pressure at which fuel is delivered to inlet 16 is important for the reason that as the pressure increases a greater portion of the float 22 must be immersed to provide an additional force on needle valve 20 to maintain it in pressure sealing contact with inlet 16. This additional force can only arise from the level of fuel in bowl 14 rising. The higher the level of fuel in bowl 14, the greater will be the rate at which the fuel is discharged into venturi passage 26 to mix with air and provide an air-fuel mixture for burning in the engine. The pressure at which fuel discharges from outlet 34 of regulator A is dependent on the magnitude of a spacing S between valve head 58 and O-ring 52. Space S will be at a maximum and fuel at maximum pressure will be discharged from regulator A to conduit 78 when stop 42b contacts the upper extremity of boss 46, as shown in FIG. 4. Valve head 58 will cooperate with O-ring 52 to provide spacing S of maximum magnitude when the negative pressure in fuel inlet manifold E is low (corresponding to high absolute manifold pressure), as occurs when engine B is being started, accelerated, or laboring under a heavy load. Stop 42b has a number of circumferentially spaced, radially extending passages 42c in its lower portion that permit fuel to flow through to first cavity 32 when the stop is positioned as shown in FIG. 4.

The components comprising regulator A may occupy either first or second positions. The first position is automatically assumed as shown in FIG. 4 when the magnitude of the negative pressure in manifold E is low, the second position illustrated in FIG. 3 when the magnitude of the negative pressure increases, as occurs when engine B is idling or operating at cruising speed. When the components are in the first position, as shown in FIG. 4, space S is greater than the corresponding space in FIG. 3, and can increase to a maximum. Fuel delivered to carburetor bowl 14 will be delivered at greater pressures. The first, FIG. 4, position corresponds to a heavy demand by the engine. The first position is a position of proportional operation. It may be initiated at a threshold pressure of, say 14 to 15 inches of mercury pressure in the manifold. With increasing absolute pressure towards atmospheric, space S gets greater and greater and the fuel pressure at the carburetor can increase to a maximum.

Operation under high demand, the FIG. 4 position, finds spring 60, fuel at pump pressure acting on end surface 58a of valve head 58, and fuel at the pressure in cavity 32 all acting upwardly on first diaphragm 42. This force is opposed by atmosphere, a downwardly directed force exerted by second spring 62, and a downwardly directed force exerted by a third spring 68 through plunger 64 all acting on diaphragm 42. Here, plunger 64 contacts the upper surface of diaphragm 42. The combined forces exerted by second and third springs 62 and 68 are of sufficient magnitude to overcome the upwardly directed forces; diaphragm 42 displaces downward until the forces balance. The greater the downward displacement, the greater the upward force of fuel pressure on diaphragm 42. The limit of downward displacement is when stop 42b contacts the upper edge of boss 46; space S then is maximum. At maximum displacement, fuel, as it flows from inlet 36 to outlet 34 in regulator A, is not subject to much resistance in passing through space S, and as a consequence the fuel is delivered to carburetor bowl 14 at maximum pressure. As space S decreases, resistance increases and fuel delivery pressure decreases. Operation with proportional fuel delivery pressure prevails only so long as the magnitude of the negative pressure in manifold E is at its lowest value, as occurs when engine B is being started, accelerated, under a heavy load, or is operated at wide open throttle.

When engine B is idling or operating at a cruising speed it does not require as rich an air-fuel mixture as when the engine is being started, accelerated or under a heavy load, and effecting a leaner air-fuel mixture results in a substantial saving in fuel. This is accomplished automatically in the present invention by the components in regulator A assuming a second, reduced pressure position when the magnitude of the negative pressure in manifold E increases.

When the magnitude of absolute pressure in manifold E drops below the threshold pressure, second diaphragm 66 flexes upwardly to draw plunger 64 away from first diaphragm 42. The combined forces exerted by the compressed first spring 60 and force exerted by fuel at pump pressure on valve head end surface 58a and on the lower surface of diaphragm 42 are sufficient to overcome the downward force exerted by compressed second spring 62. The first diaphragm 42 flexes upwardly as a result until force equilibrium exists. Equilibrium is maintained by spring 62 increasing its resistance to displacement with small increases in fuel pressure in cavity 32. As first diaphragm 42 flexes upwardly, valve head 58 moves towards O-ring 52 to decrease the magnitude of space S. The decrease in the magnitude of space S results in increased resistance to the flow of fuel past the valve, and fuel, as a result, discharges to carburetor bowl 14 at a reduced pressure of, say one and one-half pounds per square inch over a broad range of operating conditions.

Thus, the pressure at which fuel will be discharged to carburetor bowl 14 will shift automatically due to the operation of regulator A as the magnitude of the pressure in manifold E varies through established thresholds.

There is not an abrupt change of the position of valve head 58 from that shown in FIG. 4 to that illustrated in FIG. 3. The change is gradual, valve 56 being capable of occupying intermediate positions. In the intermediate positions, the lower end of plunger 64 will be in pressure contact with the upper surface of first diaphragm 42. Thus, the positions of valve head 58 illustrated in FIGS. 3 and 4 may be regarded as the two extremes of the range through which it may move in cooperating with O-ring 52 in defining space S of variable magnitude. The second spring 62 is of such compression ratio that valve head 58 can never be forced into sealing contact with O-ring 52 except in one circumstance that will be described subsequently.

The reduced pressure should be sufficiently high that engine B is not starved for fuel when suddenly accelerated or subjected to a high load. From experience it has been found that a reduced pressure of approximately one and one-half pounds per square inch is sufficient to achieve this result in many applications and maintain the fuel in bowl 14 at a level 82 substantially lower than a second level 84 that occurs when the fuel is discharged at fuel pump pressure to inlet 16, which levels are shown in FIG. 2. Vibration may cause needle valve 20 to open and pass excessive fuel into the float bowl. When a vehicle (not shown), of which internal combustion engine B may form a part is driven, carburetor F may be subjected to up and down movement in which bowl 14 moves relative to float 22 due to the inertia of the latter to unseat the needle valve. Sloshing from horizontal accelerations can result in the same problem. In short, each time there is movement of bowl 14 relative to float 22, needle valve 20 may momentarily separate from inlet 16 to allow fuel to flow into bowl 14, even though there is an adequate quantity of fuel in the bowl.

Such intermittent and repeated opening of needle valve 20 allows fuel to spurt into bowl 14 when the fuel is at pump pressure and the fuel to rise to level 84 in both the bowl and nozzle 28. The high level 84 of fuel in nozzle 28 results in fuel being drawn into the venturi passage 26 at an excessive rate to provide an unduly rich fuel-air mixture. When the fuel is at the low pressure, any such spurting has substantially less vigor, and engine B operates with the lower first fuel level 82 in carburetor bowl 14, with a consequent saving in fuel.

The opportunity for undesired bowl filling at the low pressure setting is reduced because the force tending to open the needle valve is reduced over that existing at the higher pressure.

When there is a sudden drop in absolute manifold pressure corresponding to a drop from heavy load to a moderate load, plunger 64 draws away from diaphragm 42 in response to the vacuum in chamber 74. The fuel pressure acting under diaphragm 42 is high, and it will close valve 58 on seat 52. Fuel flow stops. Fuel pressure acting on diaphragm 42 drops in response to fuel flowing into carburetor bowl 14, and valve 58 will then open. This stopping of fuel flow upon a sudden decrease in flow prevents an excess of fuel from reaching the engine, and results in fuel economy and the avoidance of loading up the engine.

The invention also attenuates conditions that cause percolation by reducing the amount of fuel in the float bowl so that a greater volume is available there to accommodate high vapor pressure occasioned by engine heat.

The present invention can produce marked improvement in fuel economy by avoiding the charging of an engine with excessive fuel. It overcomes problems associated with single high pressure fuel at the needle valve of a carburetor, leakage of fuel past the needle valve because of vibration and motion, percolation problems resulting from excess fuel in the float bowl, and load up problems resulting from a failure to reduce fuel flow upon a sudden drop in demand.

The present invention has been described with reference to certain preferred embodiments. The spirit and scope of the appended claims should not, however, necessarily be limited to the foregoing description.

What is claimed is:

1. In the combination of an internal combustion engine having a carburetor with a needle valve and a float bowl, a fuel pump for delivering fuel to the carburetor past the needle valve and a regulator for adjusting the pressure of the fuel at the needle valve, an improvement in the regulator comprising:
   (a) valve means operable to control the flow of fuel through the regulator and the pressure of fuel at the needle valve;
   (b) a first diaphragm coupled to the valve means and responsive to fuel pressure downstream of the valve means to tend to close the valve means and reduce the pressure of fuel at the needle valve;
   (c) biasing means opposing the fuel pressure to urge the valve means towards an open position and increase the fuel pressure at the needle valve, the biasing means and fuel pessure acting on the first diaphragm effecting a valve opening corresponding to a substantially reduced fuel pressure at the needle valve from the fuel pump delivery pressure under engine operating conditions corresponding to manifold pressure at low to moderate values and partial engine load;
   (d) a second diaphragm of the regulator;
   (e) means of the regulator to exert engine manifold pressure onto one side of the second diaphragm;
   (f) biasing means acting on the second diaphragm to urge it toward a fixed position;
   (g) means coupling the first and second diaphragms together at a predetermined high absolute manifold pressure less than that pressure corresponding to fully open throttle to urge the first diaphragm and the valve means towards the open position; and (h) the second diaphragm responding to engine manifold pressure such that it moves and uncouples from the first diaphragm at manifold pressures below the predetermined high pressure;

whereby, at high engine load conditions fuel pressure delivered from the regulator increases with engine load to a maximum and at low engine load conditions the fuel pressure delivered by the regulator remains substantially constant at a low value.

2. The improvement claimed in claim 1 wherein the predetermined high pressure corresponds to about 14 to about 15 inches of mercury.

3. The improvement claimed in claim 1 wherein the valve means includes a valve element and a seat, the seat being upstream from the first diaphragm, and the biasing means acting on the first diaphragm permitting the valve element to close on the seat when the second diaphragm rapidly uncouples from the first diaphragm and a high fuel pressure is acting on the first diaphragm.

4. The improvement claimed in claim 2 wherein the valve means includes a valve element and a seat, the seat being upstream from the first diaphragm, and the biasing means acting on the first diaphragm permitting the valve element to close on the seat when the second diaphragm rapidly uncouples from the first diaphragm and a high fuel pressure is acting on the first diaphragm.

5. The improvement claimed in claim 4 wherein the regulator has a cavity open to atmosphere and bounding the side of the first diaphragm opposite fuel.

6. In combination with an internal combustion engine having a carburetor with a needle valve and a float chamber, a fuel pump operable to deliver fuel to the carburetor through the needle valve, a regulator to reduce the fuel pressure at the needle valve at least during substantial portions of an engine's normal operating cycle, an engine intake manifold for passing fuel and air to the combustion chambers of the engine and located downstream from the carburetor and means pressure communicating the manifold with the regulator, an improvement in the regulator comprising:
(a) a housing having first and second cavities;
(b) a first diaphragm in the housing having opposite sides bounding the first and second cavities;
(c) passage means for fuel into the first cavity;
(d) passage means for fuel from the first cavity;
(e) valve means in the passage means into the first cavity for the control of the volume of fuel flowing into the first cavity and consequently the pressure there, the valve means being upstream of the first cavity and being coupled to the first diaphragm for movement with the first diaphragm to tend to open or to close the passage into the first cavity with the tendency to close being in response to increasing fuel pressure in the first cavity;
(f) first biasing means acting on the first diaphragm in opposition to fuel pressure in the first cavity to tend to open the valve means, the biasing means maintaining the valve element at a predetermined open position corresponding to a low fuel pressure to the needle valve and a normal operating fuel pressure in the first cavity;
(g) second diaphragm means in the housing;
(h) means in the housing to subject one side of the second diaphragm to engine manifold pressure such that the second diaphragm moves in response to changes in such pressure;
(i) means coupling the first diaphragm and the second diaphragm together only at and above a predetermined high absolute engine manifold pressure to open the valve means beyond the predetermined open position and increase the fuel pressure acting on the needle valve in proporation to increases in absolute manifold pressure above the predetermined high absolute engine manifold pressure; and
(j) second biasing means acting on the second diaphragm to urge it into a fixed position.

7. The improvement claimed in claim 6 wherein the valve means includes a seat and a valve element, the valve element closing the passage into the first cavity when seated on the seat, the biasing means acting on the first diaphragm permitting such seating only upon an uncoupling of the first and second diaphragm and the existence of fuel pressure in the first cavity above the normal operating fuel pressure.

8. The improvement claimed in claim 7 including third biasing means acting on the valve element in opposition to the first biasing means.

9. The improvement claimed in claim 8 wherein each biasing means includes a compression spring.

10. The improvement claimed in claim 9 wherein the coupling means includes a plunger attached to and carried by the second diaphragm.

11. The improvement claimed in claim 9 wherein the second cavity opens to atmosphere.

12. The improvement claimed in claim 11 wherein the coupling means includes a plunger attached to and carried by the second diaphragm.

13. In combination with an automotive fuel pump having a fuel discharge opening from which fuel is discharged at a first pressure and a carburetor having a fuel inlet and a float actuated needle valve that regualtes the height of fuel in the bowl of said carburetor in accordance with the magnitude of the pressure of said fuel delivered to said fuel inlet, a device actuated by the degree of vacuum in a manifold of the engine which is supplied by fuel and air from said carburetor to reduce the pressure of said fuel from said first pressure to a second lesser pressure when said engine is being started, accelerated or under a substantial load, and to a third pressure less than said second pressure when said engine is idling or at a cruising speed, said device including:
(a) a first hollow body that has a fuel inlet in communication with said fuel discharge opening of said fuel pump;
(b) a first resilient diaphragm transversely disposed in said first hollow body and that subdivides the interior thereof into first and second cavities, said second cavity vented to the atmosphere;
(c) a valve seat within said housing intermediately disposed between said inlet and said first cavity;
(d) a valve member that depends from said first diaphragm through said valve seat, said valve member including a flat valve surface substantially parallel to said first diaphragm and an upwardly and inwardly tapering side surface adjacent said flat surface that extends towards said first diaphragm, with a portion of said tapered side surface adjacent said flat valve surface of greater diameter than said valve seat, said tapered side surface and said valve seat cooperating to define an annulus space that varies in width as said first diaphragm flexes upwardly and downwardly;
(e) first conduit means that connect said fuel inlet of said carburetor to a discharge opening in said housing in communication with said first cavity;

(f) a stop on said first diaphragm that limits the movement of the latter towards said valve seat to provide a maximum width for said annulus space;

(g) first spring means that urge said valve member towards said valve seat;

(h) second spring means of greater strength than said first spring means that urge said valve member away from said valve seat;

(i) a plunger slidably mounted in said housing and axially aligned with said valve member, said plunger having first and second ends, said first end capable of contacting said first diaphragm;

(j) a second circular resilient diaphragm that has said second end of said plunger secured thereto;

(k) a second hollow body secured to said first hollow body and with the peripheral portion of said second resilient diaphragm gripped therebetween, said second hollow body and said second diaphragm cooperating to define a confined space therebetween;

(l) third spring means that at all times tend to maintain a sufficient force on said second diaphragm and plunger so as to maintain said first diaphragm and valve member in a position where said annulus space is of maximum width and said fuel is delivered to said carburetor at said second pressure; and (m) second conduit means that connect said confined space to said manifold so that the magnitude of vacuum increase as said engine idles or operates at cruising speed occurs in said confined space to deform said second resilient diaphragm upwardly to overcome the force of said third spring means and to separate said plunger from said first diaphragm, the pressure of said fuel in said first cavity and the force of said first spring means overcoming the force of said second spring means after said plunger separates from said first diaphragm to deform said first diaphragm upwardly to lessen the width of said annulus space and reduce the pressure of fuel delivered to said carbuetor from said second pressure to said third pressure, but upon said engine being accelerated or subjected to a substantial load, the vacuum in said manifold and confined space decreases and allows said third spring means to deform said second diaphragm downwardly to force said plunger into contact with first diaphragm and return said valve member to a position where it provides an annulus space of maximum width with said valve seat to permit said fuel to be delivered to said carburetor at said second pressure.

* * * * *

UNITED STATES PATENT AND TRADEMARK OFFICE
CERTIFICATE OF CORRECTION

PATENT NO. : 4,745,904
DATED : May 24, 1988
INVENTOR(S) : Toby T. Cagle, deceased (by Gary A. Cagle, Administrator)

It is certified that error appears in the above-identified patent and that said Letters Patent is hereby corrected as shown below:

In the Claims:

| | |
|---|---|
| Column 8, Line 52 | Change "pessure" to -- pressure --. |
| Column 10, Line 34 | Change "regualtes" to -- regulates --. |
| Column 12, Line 20 | Before "first" and after "with", insert -- said --. |

Signed and Sealed this

Twentieth Day of December, 1988

*Attest:*

DONALD J. QUIGG

*Attesting Officer*      *Commissioner of Patents and Trademarks*